(12) United States Patent
Gemmell et al.

(10) Patent No.: US 7,334,195 B2
(45) Date of Patent: Feb. 19, 2008

(54) SYSTEM AND PROCESS FOR PRESENTING SEARCH RESULTS IN A HISTOGRAM/CLUSTER FORMAT

(75) Inventors: David James Gemmell, Danville, CA (US); Roger Allen Lueder, San Francisco, CA (US); Chester Gordon Bell, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 626 days.

(21) Appl. No.: 10/684,620

(22) Filed: Oct. 14, 2003

(65) Prior Publication Data

US 2005/0080769 A1    Apr. 14, 2005

(51) Int. Cl.
*G06F 3/00* (2006.01)
(52) U.S. Cl. .................. 715/841; 715/968; 715/838; 715/821; 707/3
(58) Field of Classification Search ............... 715/830, 715/833, 838, 968, 821, 822, 823, 824, 760, 715/841; 707/3, 102, 7
See application file for complete search history.

(56) References Cited

U.S. PATENT DOCUMENTS

| | | | | |
|---|---|---|---|---|
| 5,339,391 | A * | 8/1994 | Wroblewski et al. | 345/607 |
| 5,982,369 | A * | 11/1999 | Sciammarella et al. | 715/835 |
| 6,147,683 | A * | 11/2000 | Martinez et al. | 715/786 |
| 6,760,676 | B2 * | 7/2004 | Nygaard, Jr. | 702/79 |
| 7,036,085 | B2 * | 4/2006 | Barros | 715/764 |
| 2003/0033296 | A1 * | 2/2003 | Rothmuller et al. | 707/3 |
| 2005/0044066 | A1 * | 2/2005 | Hooper et al. | 707/3 |
| 2005/0044100 | A1 * | 2/2005 | Hooper et al. | 707/102 |

OTHER PUBLICATIONS

Kang et al, " Visualization Methods for Personal Photo Collection: Browsing and Searching in the PhotoFinder", 2000, IEEE, pp. 1539-1542.*
SciFinder, "SciFinder Scholar 2001 User Guide", Oct. 2001, American Chemical Society, chapter 7.*
Screen captures images from "Microsoft Powperpont 2000", 2000, p. 1-3.*
Chemical Abstracts Service, SciFinder Scholar—Analyze Tool, *CAS Chemical Abstracts Service Homepage*, Oct. 22, 2003, <http://www.cas.org/SCIFINDER/SCHOLAR/schanalyze.html> (Aug. 25, 2003).
Kang, H., B. Schneriderman, Visualization methods for personal photo collections: Browsing and searching in the photofinder, *IEEE Int'l. Conf. on Multimedia and Expo (III) (ICME2000)*, pp. 1539-1542.
Kleinfeldt, S., J. Baphna, A commercial perspective on hypertext search results, May 30, 2000, http://www.ics.mq.edu.au/~einat/info-doors/program/Kleinfeldt.html (Aug. 25, 2003).

* cited by examiner

*Primary Examiner*—Ba Huynh
*Assistant Examiner*—TuyetLien Tran
(74) *Attorney, Agent, or Firm*—Lyon & Harr, LLP; Richard T. Lyon

(57) ABSTRACT

A user interface system and process for graphically displaying the results of a standard search, such as a database search, to a user on a display device via an interactive search results window in which the user views and filters search results items. These results can be presented in either a cluster or histogram format, or both. This allows the user to visualize the results graphically, rather than just displaying a list of the items found. In addition the presentation of the search results can be graphically manipulated to easily filter the results as desired by the user.

33 Claims, 5 Drawing Sheets
(4 of 5 Drawing Sheet(s) Filed in Color)

SYSTEM AND PROCESS FOR PRESENTING SEARCH RESULTS IN A HISTOGRAM/CLUSTER FORMAT

BACKGROUND

1. Technical Field

The invention is related to displaying the results of an electronic search, such as a database search, to a user, and more particularly to a system and process for graphically displaying the results of a search to a user on a display via an interactive search results window having a histogram and/or cluster format in which the user views and filters search results items.

2. Background Art

The personal computer will eventually have extremely large amounts of storage capacity, resulting in larger data stores, and search results that will be produced in large sets. These large search results sets will be difficult to analyze effectively. Thus, navigation and filtering (reduction) of the search results is needed.

The typical timeline displays of the search results can be difficult to deal with in certain scales of time or number of objects. Further, clustering of the search results can be advantageous from a filtering standpoint, however, no matter how good some clustering algorithms are, the human eye can do a better job.

Humans are capable of looking a search results and clustering them instantly, and often in multiple ways at once. Hence, a visualization of the search results in way that a human can filter them is the key to handling large results sets. The present invention provides techniques for such a visualization.

SUMMARY

The present invention is directed toward a user interface system and process for graphically displaying the results of a search to a user on a display device via a search results window. These results can be presented in either a clustering or histogram format, or both. A histogram and/or clustering of the search results allows the user to easily browse through the results, and as will be described shortly, filter (i.e., reduce to a smaller set) the results.

More particularly, a graphic data presentation sector in the search results window is used to present the results of a standard search, such as a database search, in a manner that allows the user to visualize the results graphically, rather than just displaying a list of the items found. If a clustering format is used, a clustering of the search results items in terms of a user-specified independent variable corresponding to a common attribute of at least some of the search results is computed to form a plurality of cluster subdivisions. The independent variable can be, for example, a date associated with a search results item, a search result item type, or the file size of a search results item. Each of the subdivisions represents a portion of the search results items within a particular range of the independent variable as determined by the clustering. Any conventional clustering approach can be employed to accomplish the foregoing task. The resulting clustered search results are then displayed in the presentation sector as a series of cluster subdivisions displayed in the order dictated by the independent variable. Each subdivision is visually distinguished from the other subdivisions and has a length along the axis of the independent variable proportional to the number of search results items within that subdivision. In addition, a scale for the independent variable can be included, which is made up of periodically placed alphanumeric characters and markings indicating the value of the independent variable at the location where it is display along the independent variable axis.

If a histogram format is employed alone, the aforementioned clustering is not performed, and instead, a histogram of the search results items is computed in terms of the aforementioned user-specified independent variable. The resulting histogram is then displayed in the graphic data presentation sector of the window. The bars of the histogram each represent a histogram bin corresponding to a particular range of the independent variable and each have a length proportional to the number of search results items determined to be in the associated bin. Additionally each bar extends perpendicular to the axis of the independent variable. In embodiments having a combined histogram and cluster format, the clustering is computed and displayed in the presentation sector as described above, and in addition, the histogram is computed and displayed in the presentation sector over the cluster subdivisions. The histogram is also aligned with the cluster subdivisions.

The search results window can also be made interactive whereby the user not only can view the search results as described above, but can also filter the results. If a histogram only format is used, this interaction is facilitated by a selection pane covering a fractional region of the displayed histogram along the axis of the independent variable. The selection pane is made to be visually distinguished from the remaining parts of the histogram and represents a currently highlighted portion of the histogram. It is moved along the independent variable axis of the histogram by the user to highlight a desired portion. Upon the user selecting the portion of the histogram highlighted by the selection pane, a new histogram is computed for just those search results items associated with the selected portion. This new histogram is then displayed in the graphic data presentation sector in lieu of the previously displayed higher-order histogram.

Thus, the user has effectively filtered the search results to his or her liking. If a clustering or combined format is employed, the filtering takes a different form. Namely, the user selects one of the clustering subdivisions. This results in those search results items associated with the selected subdivision being re-clustered, and the cluster subdivisions associated with the re-clustered search results items are displayed in the presentation sector in lieu of the previously displayed higher-order clustering. In the combined histogram/cluster format, when the user selects one of the cluster subdivisions, the histogram is also re-computed for just those search results items in the subdivision, and displayed over the new cluster sub-divisions in lieu of the previously displayed higher-order histogram.

The search results window can also include a counter that displays the total number of search results items included in the histogram and/or cluster subdivisions currently displayed in the graphic data presentation sector. Further, the window can include a list sector used to display a listing of search results items included in the histogram and/or cluster subdivisions. The items displayed in the list sector are scrollable in the case where the items associated with the currently displayed histogram or cluster subdivisions are too numerous to display all at once in the space allotted to the sector. The items listing can be as simple as a file name, or they can include a list of file attributes as well. The items can even include representative thumbnail images. This latter option is particularly useful if the search results items are images or video clips. The display of the list sector can also be optional, with the user specifying whether it is to be included in the current view of the search results window or not. This is also true of the histogram in the combined histogram/cluster format. Thus, a user can choose to view the histogram or hide it from view, as desired.

Still further, the search results window can include an overview sector. In the case of the histogram format, the overview sector displays an overall histogram computed from the complete set of search results, even if the presentation sector is displaying a histogram of a smaller portion of the search results items, as described previously. In the case of the cluster or combined format, the overview sector displays an overall clustering computed from the complete set of search results (as well as the histogram if employing a combined format). The overview window can also include an indicator pane covering the portion of the overall histogram/cluster subdivisions that corresponds to the search results items used to compute the histogram/clustering currently displayed in the graphic data presentation sector.

The search results window when employing the clustering format can further include a range list, which is either displayed in the list sector or in a separate sector of its own. The range list includes a listing of the independent variable range and the number of search results items associated with each cluster subdivision currently displayed in the graphic data presentation sector. Each entry in the range list can also be visually distinguished from the other entries in the same way as the cluster subdivisions associated therewith are distinguished in the graphic data presentation sector. In this way a user can readily determine which cluster the entry applies to. In one version of the search results window where the range list is displayed in the list sector, either the range list or the listing of search results items is displayed, but not both, as specified by the user.

Another optional feature of the cluster or combined formats is the inclusion of a slider-guide. This entails displaying a guide pane over a part of the displayed cluster subdivisions along the axis of the independent variable. The guide pane is visually distinguished from the cluster subdivisions, while allowing the cluster subdivisions to be seen through the guide pane. The portion of the cluster subdivisions covered by the guide pane represents the currently highlighted portion of the search result items. A complementary highlighting pane is displayed over at least a portion of the search results items listed in the list sector. This highlighting pane is also visually distinguished from the listed search results items in a manner that allows the items to be seen through the highlighting pane. In this case, the portion of the search results item entries covered by the highlighting pane correspond to the items associated with the cluster subdivision or subdivisions or parts thereof covered by the guide pane. The highlighting and guide panes can be visually distinguished in the same way so as to indicate to the user that the guide pane and highlighting pane are related. When the user slides the guide pane along the independent variable axis of the cluster subdivisions to highlight a desired portion thereof, the highlighting pane also moves to cover those search result items listed in the list sector that correspond to the items associated with the subdivision or subdivisions or parts thereof covered by the guide pane. In addition, when the number of search results items associated with the cluster subdivisions exceed that which can be displayed at one time and the user moves the guide pane to cover a portion of the cluster subdivisions that is associated with search results items not currently displayed in the list sector, the search result items are scrolled so as to bring the items associated with the portion of the cluster subdivisions covered by the guide pane into view.

The search results items can be displayed in ascending order with regard to the independent variable in columns or rows on a cluster subdivision-by-subdivision basis, such that each successive column or row associated with a particular subdivision displays as many search results items as will fit in the space allotted for a respective full column or row in the list sector or as many search result items as there are left in the subdivision which are not displayed in a preceding column or row. When this listing configuration is employed, yet another optional feature of the cluster format can be included—namely, a pseudo histogram map feature. In essence, this feature involves displaying a pseudo histogram map of the search results items over the cluster subdivisions. This map has bars oriented perpendicular to the independent variable axis, each of which represents a column or row of search results items as they would be displayed in the list sector. In addition, each map bar has a length proportional to the number of search results items represented. Each cluster subdivision is displayed with a width, while still proportional to the number of search results associated therewith, that is long enough so that all the pseudo histogram map bars representing the search results items of the subdivision are displayed within the subdivision. In one version of the pseudo histogram map feature, the bars appear as a series of separated co-linear blocks, each of which represents the same number of search results items. For example, each block could represent one search results item. This provides a way for the user to easily know how many items are listed in the applicable column or row with just a glance.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
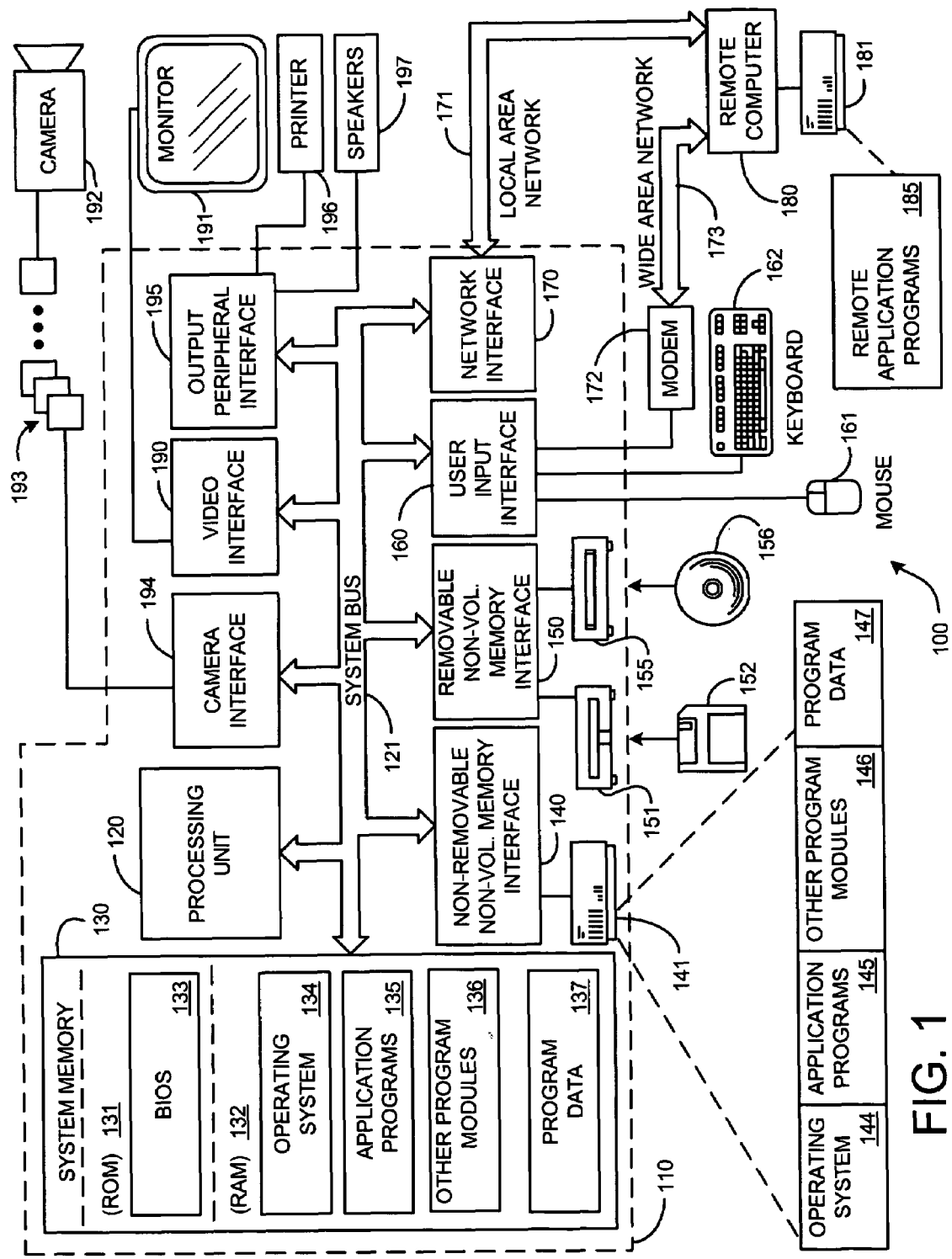
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA), Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The Search Results Presentation System and Process

The exemplary operating environment having now been discussed, the remaining part of this description section will be devoted to a description of the program modules embodying the invention. Generally, the system and process according to the present invention involves providing a user interface that displays the results of a standard search, such as a database search, in a manner that allow the user to visualize the results graphically, rather than just displaying a list of the items found. In addition, the user is given the ability to interact with the displayed results in order to filter them. In regard to this interaction with the interface, any convention method of selection could be implemented to allow the user to select functional features of the interface window. In tested versions of the present system and process, two modes of selection were implemented-namely standard single click and double click selection modes. For example, if the user is employing a conventional mouse or touch pad as an input device, the screen cursor would be moved as usual with the device and placed over the icon, button or other indicator whose associated function the user wants to activate. The user then "clicks" a selection button on the device either once or twice, as needed to activate the desired function.

In one embodiment, the results are displayed in the form of a histogram, in another embodiment the results are displayed in visually segregated groups or clusters. In yet another embodiment, these foregoing display modes are combined to show both the histogram and the clusters. In addition to displaying the search results in the foregoing ways, the user is also able to select a portion of the histogram or one of the clusters, and reduce the displayed search results to those associated with the selected region.

In all of the foregoing embodiments of the search results presentation system and process, it is presumed that the user has performed a search via conventional means and that the search results, in the form of a list of items found, is available. The user first selects how the search results are going to be categorized for presentation via one of the aforementioned embodiments. For example, the categories can include sorting the found items by date, type of data, or file size. In fact, the categories can include any attribute known about all or at least some of the found items. The user selection of how the search results are to be categorized can be accomplished in several ways. For example, the interface can be configured to allow the user to directly enter the desired categorization choice. Alternately, the aforementioned graphic interface could present the user with a list of prescribed categorization choices, which the user would then select from. It is also possible to present the data using one of the aforementioned embodiments with multiple categorizations. This would allow the user to work with any of the search result categorizations as desired.

The configuration and interactive functionality of user interfaces for each of the foregoing embodiments is described in the sections to follow.

2.1 The Histogram Format

Figure 2:
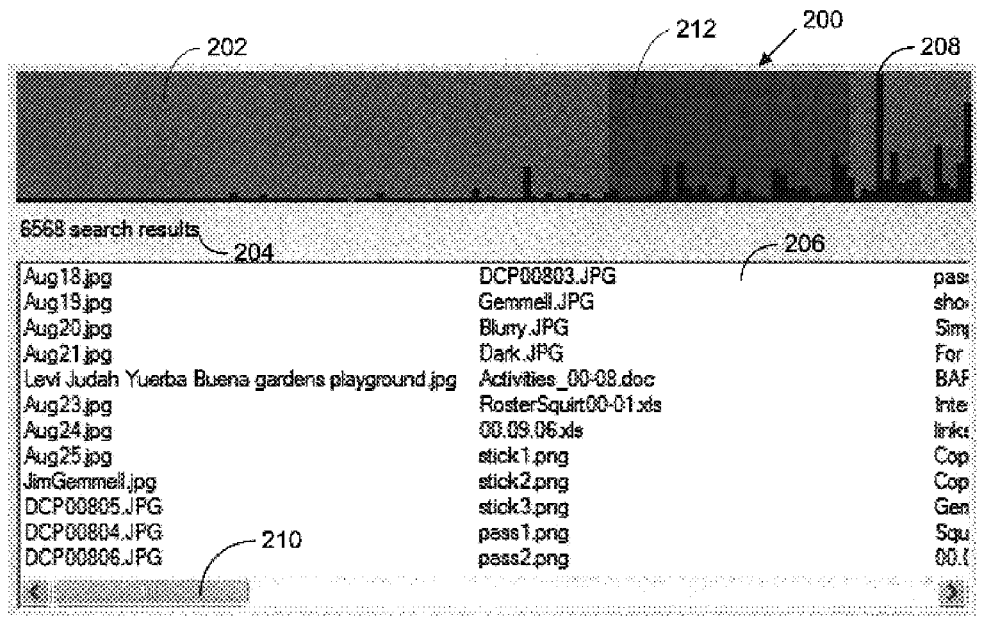
FIG. 2 shows a search results window layout according to the present invention for a histogram format of the search results presentation system and process.

An exemplary layout of a user interface window 200 employing the histogram format is shown in FIG. 2. In the depicted version of the window 200, a horizontally oriented graphic data presentation sector 202 is shown at the top. In addition, an optional search results counter 204 is shown just below the graphic data presentation sector 202, and an optional search results list sector 206 is shown at the bottom of the window 200. The layout of the foregoing sectors shown in FIG. 2 can be rearranged and reoriented as desired. For example, the graphic data presentation sector could be vertically oriented and displayed at one side of the search results window with the list sector being displayed on the other side of the window.

The graphic data presentation sector 202 is used to display a histogram of the search results in terms of the selected categorization choice. For example, in the example histogram shown in FIG. 2, the search results consisted of images and the independent variable or attribute used to categorize the data was the creation date of the image file. Each vertical bar 208 of the histogram represents a histogram bin and its height is made proportional to the number of search result items associated with that bin. Thus, the bar 208 representing the bin having the most items would extend from the bottom to the top of the graphic data presentation sector 202, an each of the other bars would be scaled according to the number of items associated therewith. The proportionality can be linear or logarithmic depending on the range of the number of items in the bins. It is noted that the area allotted to the graphic data presentation sector 202 on the display device displaying the window 200 will dictate the resolution of the histogram. For example, there is a practical limit on the minimum width that each bar can exhibit and still be recognized as a separate bin by the user. In tested versions of the present invention this practical limit was set to the width of 4 pixels. This limit on the width of the histogram bars in turn dictates the range size of each bin. For example, assume the overall width allotted to the graphic data presentation sector 202 is 600 pixels and the search results represent images created over a period of 60 months. Given a 4 pixel minimum histogram bar width, there would be a maximum of 150 bars, and so the search results would be categorized into 150 bins, each representing a range of 60/150=0.4 months. There is also a practical limit to the relative heights of the histogram bars. In other words, there is some unit number of search result items associated with each vertical increment in a histogram bar. For example, assume the vertical increment is set to 4 pixels (as in tested embodiments of the present invention). Also assume that the maximum number of search result items in a single bin was found to be 100 and that the maximum height allotted to the graphic data presentation sector 202 is 100 pixels. Given these parameters, the maximum number of vertical increments would be 25, and so the unit number of search result items would be 100/25=4. When the height of a histogram bar is determined prior to its display, the number of items scheduled for the bin associated with the bar under consideration is divided by the aforementioned unit number. The result dictates how many vertical increments are displayed in association with that bar. For example, assume a bin has 43 search results items. This number is divided by the unit number which in this example yields 43/4=10 with a remainder of 3. Thus, in this case the vertical bar representing this bin would be at least as high as 10 vertical increments (e.g., 4 pixels×10 increments=40 pixels). As for the remainder, this can be handled in a variety of ways. The number of increments allotted a bar when a remainder is present could be rounded down, thus ignoring the remainder, or it could be rounded up, thus always adding an additional increment when a remainder exists. Yet another way is to round down if the remainder is one half of the unit number or less, and round up if it is more than one half (or round down if the remainder is less than one half of the unit number, and round up if it is equal to or more than one half).

In regard to the optional search results counter 204, when included in the window 200, it would list the total number of search result items included in all the bins of the histogram currently displayed in the graphic data presentation sector 202. This number can change if the graphic data presentation sector 202 is directed to display a histogram of just a portion of the overall histogram as will be described shortly.

In regard to the optional search results list sector 206, it displays a listing of all the search result items. In the example shown in FIG. 2, the list sector 206 displays a list of image files arranged in order of there creation date. It should be noted that in the example shown, just the file name of the image is displayed in the list. However, a more detailed listing can also be displayed which shows a desired selection of attributes associated with each search result item. For example, for the list of image files displayed in FIG. 2, the file size, date the file was last saved, and so on, could be included. It is also noted that not all the items associated the list may be able to be displayed in the room available in the list sector 206. However, the user can manually scroll through the list, moving up or down as desired, to display whatever item in the list the user desires. In the tested versions of the present system, this scrolling is performed using a graphic scroll bar 210 that is displayed at the bottom of the list sector 206, as shown in FIG. 2. However, any other conventional scrolling method could alternately be made available for this purpose, such as using the arrow keys on a keyboard. In addition, the placement of the aforementioned graphic scroll bar 210 can be any desired (e.g., at the top or to the side of the list sector 206).

It is further noted that the window 200 can be configured so that the list sector 206 can be displayed or not at the discretion of the user. One way this is accomplish is to include an icon or button (not shown in FIG. 2) in the window 200 that when selected by the user causes the list sector 206 to be displayed when it is not, and causes it to be hidden when it is displayed.

2.1.1. Search Results Filtering With the Histogram Format

Referring once again to FIG. 2, it can be seen that a portion of the graphic data presentation sector 202 is highlighted. In the case of the example window in FIG. 2 the region is highlighted by shading it differently than the rest of the histogram, although any conventional highlighting method would suffice. This region is a selection pane 212 representing a currently highlighted fraction of the overall histogram. The fraction covered can be any size desired, and can be prescribed or user-specified. For example, in tested embodiments, the region size was preset to cover 25% of the independent axis of the histogram. The user has the ability to move the selection pane 212 along the independent axis of the histogram. This can be accomplished in any conventional way. For example, in tested embodiments the user controlled the location of the selection pane 212 by hovering the mouse over the graphic data presentation sector 202. In response, the user interface displays the selection pane 212 over the portion of the histogram centered on the mouse location along the independent axis.

Figure 3:
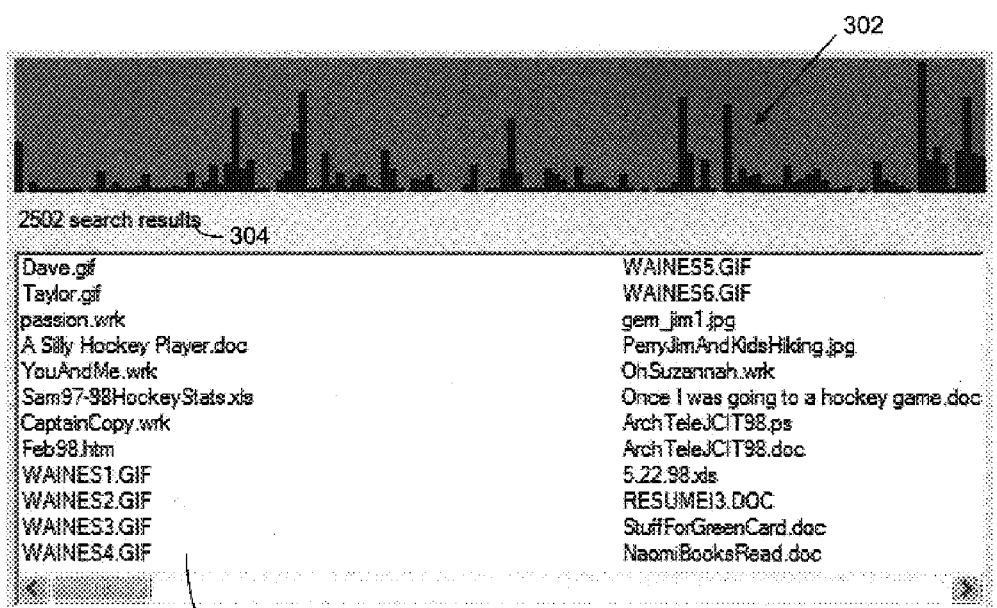
FIG. 3 shows the search results window of FIG. 2 where a user has selected a portion of the histogram and a new histogram has been computed for just those search results items in the selected portion and displayed in lieu of the higher level histogram of FIG. 2, thereby filtering the search results and reducing the number of items from 6568 to 2502.

In general, the selection pane 212 is used to filter the search results to consider only those that fall within the region centered on the mouse location. The user indicates his or her desired to filter the results to the highlighted portion of the histogram in any conventional manner, such as by "clicking" the mouse button when the selection pane 212 is over the desired position of the histogram. The histogram is then updated (i.e., effectively zoomed) to only cover the new, restricted range of values for the independent variable in the histogram. This is illustrated in FIG. 3, where the portion of the overall histogram covered by the selection pane in FIG. 2 was selected by the user, and a new histogram 302 is generated for just the search results in the selected range. Note that the previously described rules for display of the histogram in the graphic data presentation sector are applied to the new sub-range of the search results. Thus, the histogram looks completely different from the portion selected in the overall histogram of FIG. 2. This is because there is often a new maximum bin count and the bin ranges are modified. Also note in FIG. 3 that the search result counter 304 changed to include only search result items in the selected range and the listed items in the list sector 306 changed to cover only the items in the selected range. While not shown in FIG. 3, a selection pane would be displayed over the histogram representing the reduced range of the search results. This allows the user to repeat the just described selection procedure to filter the search results even further and a histogram for the newly restricted range to be displayed in the graphic data presentation sector. This "drilling down" process can continue as desired to the point that there is just one or even zero items left.

While not shown in FIGS. 2 and 3, the search results window can also include a second "overview" sector that shows the base level histogram with a highlighted region (i.e., indicator pane) representing the portion thereof that is the subject of the "zoomed" histogram displayed in the graphic data presentation sector. This indicator pane gives the user a sense of where he or she is in the original search results. In the case where the graphic data presentation sector is displaying the base level histogram, the overview sector histogram would be displayed with the indicator pane covering the entire length of the independent axis of the overview histogram.

2.2 The Cluster Format

In this embodiment of the search results presentation system and process, the search results items, after being first categorized using the selected categorization type, are automatically subdivided into contiguous clusters. This clustering can be done via any conventional method. For example, if the independent variable (i.e., categorization type) is date, the items can be subdivided into months. More complex clustering algorithms, such as k-means, can also be employed.

Figure 4:
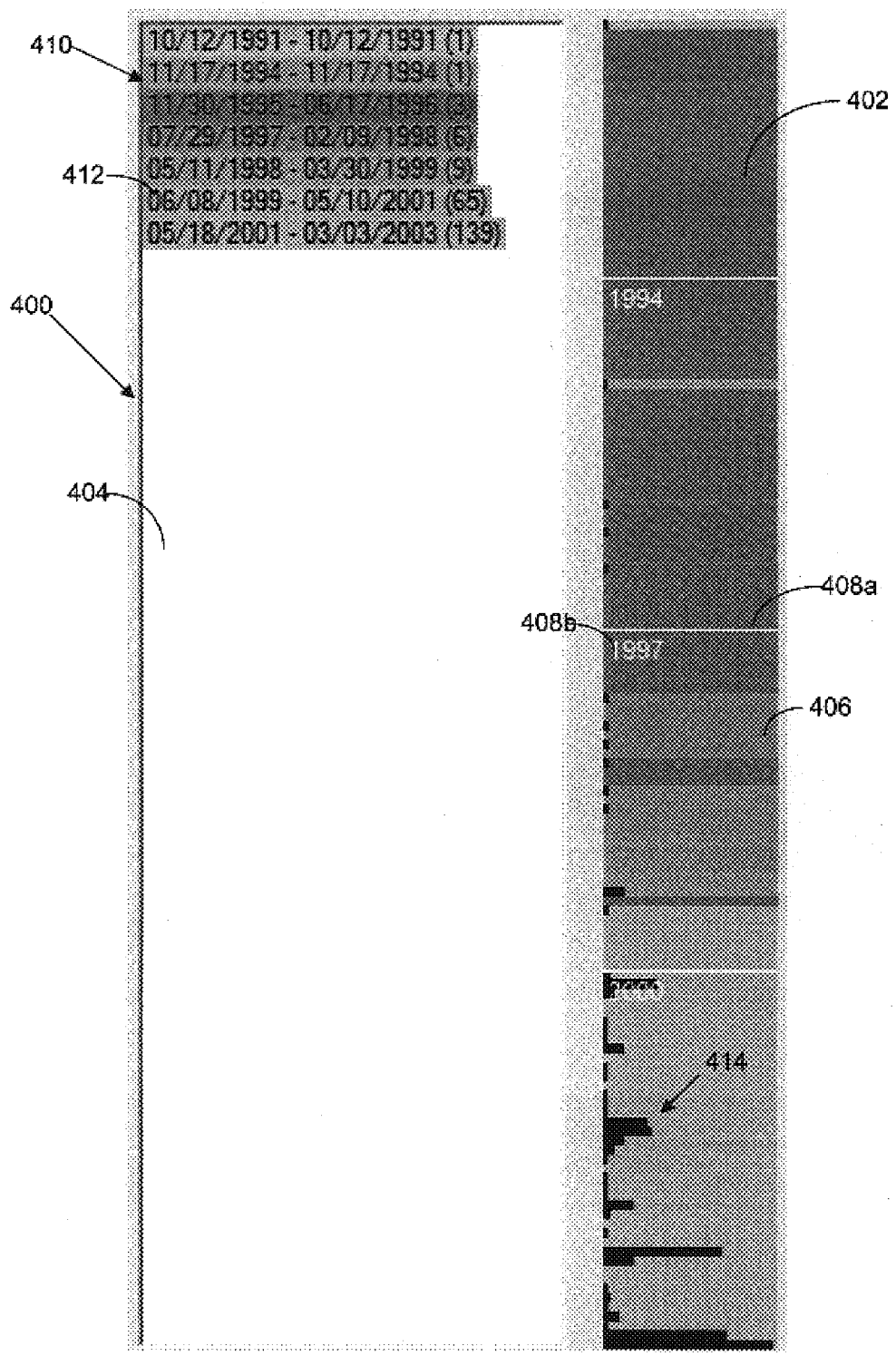
FIG. 4 shows a search results window layout according to the present invention for a cluster format of the search results presentation system and process, with the optional histogram feature enabled and the range list displayed in the list sector.

Once the search results data has been clustered it is displayed to the user in the cluster format, as exemplified by the search results window 400 depicted in FIG. 4. In the depicted version of the window 400, a vertically oriented, graphic data presentation sector 402 is shown on the right side. An optional search results list sector 404 is displayed in the left side of the window 400. The layout can also include the aforementioned search results counter, although it is not shown in the example window of FIG. 4. As with the histogram format window, the layout of the foregoing sectors of the cluster format window shown in FIG. 4 can be rearranged and reoriented as desired. For example, in this depicted example, the graphic data presentation sector is vertically oriented. However, it could be horizontal with the list sector displayed above or below it.

The graphic data presentation sector 402 is used to graphically display the clustered search results items. Essentially, each clustered group of search results items is represented by a subdivision 406 having a different color and/or texture (or some other visually differentiating indicator) than other subdivisions. Each subdivision 406 is also sized in proportion to its range in regard to the independent variable. For example, if time is the selected independent variable and different colors are employed as the visual differentiating technique, each subdivision 406 in the graphic data presentation sector 402 will have a length that is proportional to the time-span of the cluster and exhibit a different color, similar to the example sector shown in FIG. 4. It is noted that the graphic data presentation sector 402 can also include alphanumeric characters and other markings representing a scale for the selected independent variable. For example, one way of implementing this feature is to display lines 408a across the sector at places corresponding to a particular value of the independent variable and include a label 408b adjacent each line listing the value associated that line. An example of this is shown FIG. 4 where the independent variable is time, and lines 408a representing the beginning of a year are shown at appropriate locations in the sector with the year they represent listed just below the line.

It should be noted that while the subdivisions 406 employed in the cluster format window 400 have a size indicative of the range of the independent variable covered, they do not by themselves indicate how many search results items are included in the cluster. This information can be quite useful in filtering search results, and so can be included in the clustering window 400. One way of including this information is to provide a range list 410, such as the example list depicted in the list sector 404 in FIG. 4. It is noted that the range list 410 could also be displayed in a separate sector of its own (not shown), if desired. Generally, the range list 410 includes a listing for each cluster subdivision and indicates the range of the independent variable covered by that subdivision and the number of search results items found in the subdivision. The range list entries 412 can also be coded to match their corresponding cluster subdivisions in the graphic data presentation sector 402. For example, as shown in FIG. 4, the entries 412 are "boxed" with a region that matches the color and/or texture (or other visually distinguishing indicator) of the corresponding subdivision 406. As with the histogram format of the search results window, the list sector 404 can also provide the listing of the search results items described previously, and the user is allowed to choose which list is displayed. In one version of the cluster format window 400, the range list is shown by default, and the user specifies if he or she would like the list of items displayed instead. While not shown in the example window of FIG. 4, this can be done by including a conventional menu bar with a selection item for switching between the list modes, or via a button displayed within or adjacent to the list sector 404. Still further, as in the histogram format of the search results window, the list sector 404 can be displayed or not at the discretion of the user.

Another way that the number of search results items found in a cluster subdivision 406 can be imparted to the user is to superimpose a histogram 414 as described in connection with the histogram format of the search results window onto the clusters displayed in the graphic data presentation sector 402. An example of this option is shown in FIG. 4. The histogram option can be implemented in addition to or instead of the previously described cluster range list 412. In addition, the user can be given the ability to choose whether the histogram 414 is displayed over the cluster subdivisions 406 or not. Here again, while not shown in the example window of FIG. 4, this can be done by including a conventional menu bar with a selection item for switching the histogram display on or off, or via a button displayed within or adjacent to the graphic data presentation sector 402. An advantage of this latter feature is that the histogram 414 can sometimes be a distraction. For example, if the distribution of search results items is substantially uniform, the resulting histogram 414 would show "all bars", thereby masking the cluster subdivisions 406. In such a case the user could simply turn the histogram display feature off.

2.2.1. Search Results Filtering With The Cluster Format

In the case of the cluster format of the search results window 400, the user can filter the search results by simply selecting (in any conventional manner) one of the cluster subdivisions 406 in the graphic data presentation sector 402.

The search result items associated with the selected cluster subdivision 406 are then re-clustered and the graphic data presentation sector 402 is then updated to reflect the clustering for the new, restricted range of values for the independent variable. In this way the search results are effectively zoomed. If the histogram display option is included and active, the histogram 414 would also be updated to the restricted range as described earlier and displayed over the cluster subdivisions 406.

The user can filter the search results even further by selecting one of the newly displayed clusters, thereby repeating the updating procedure for the range associated with that cluster. As with the histogram format of the search results window, this "drilling down" process can continue as desired to the point that there is just one or even zero items left.

While not shown in FIG. 4, the cluster format embodiment of the search results window can also include a second "overview" graphic data presentation sector that shows the base level clustering with a highlighted region (i.e., indicator pane) representing the portion thereof that is the subject of the "zoomed" clustering displayed in the graphic data presentation sector. As in the case of the histogram format, the indicator pane gives the user a sense of where he or she is in the original search results. In the case where the graphic data presentation sector is displaying the base level clustering, the overview graphic data presentation sector is displayed with the indicator pane covering the entire length of the independent axis.

2.2.2. The Cluster Slider/Guide

Figure 5:
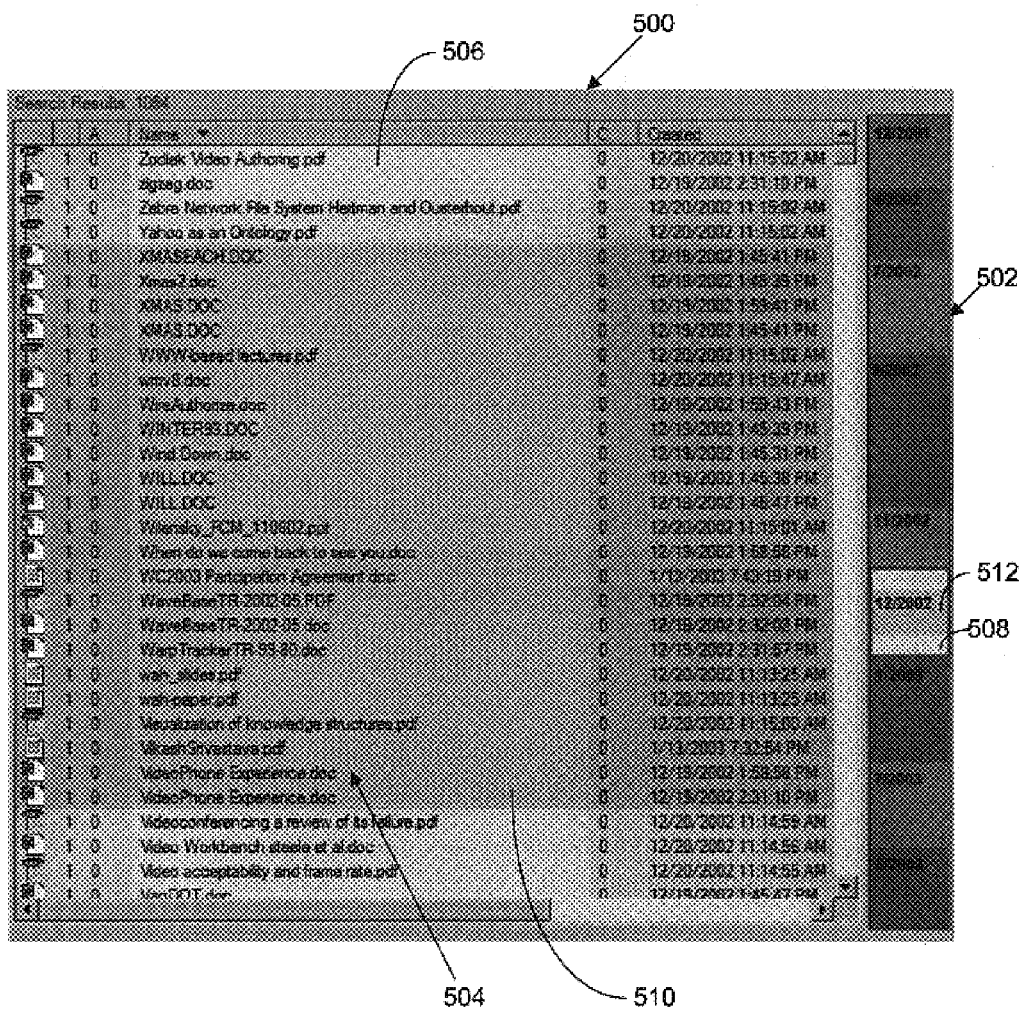
FIG. 5 shows a search results window layout according to the present invention for a cluster format of the search results presentation system and process, with the search results list displayed in the list sector and the optional cluster slider/guide feature implemented.

The cluster slider and/or guide is an optional feature of the cluster format window that allows the user to scroll through the search results displayed in the aforementioned list sector, similar to the scrolling described earlier, but with an added guide pane. In one embodiment of the cluster slider/guide feature, the guide pane 508 is displayed in the graphic data presentation sector 502 over a portion thereof which corresponds to at least some of the search results 504 displayed in the list sector 506, as shown in the example cluster window 500 of FIG. 5. A complementary highlighting pane 510 is also displayed in the list sector 506 over those search results items 504 corresponding to the portion of the clusters 512 covered by the guide pane 508. The guide pane 508 and highlighting pane 510 have a similar appearance in that each highlights the underlying objects displayed in their respective sectors in a manner that indicates to the user that they are related. For example, the panes 508, 510 could impart the same color to the underlying objects or identical texture, or they could surround the underlying objects with a box, or the color of the objects underlying the panes could be brightened (or alternately the color of object not under the pane could be dimmed). In general, any visually distinguishing method can be employed that will make the panes 508, 510 standout and match. It is noted that in the example cluster format window shown in FIG. 5, a histogram was not displayed over the clusters. This need not be the case.

The size of the guide pane 508 dictates how much of the displayed search results 504 are highlighted in the list sector 506. It could be sized so that those search result items 504 corresponding to the portion of the clusters 512 covered by the guide pane 508 completely fill the allotted display space of the list sector 506. Alternately, the guide pane 508 could be smaller, such that only part of the search results items 504 displayed in the list sector 506 corresponds to the portion of the clusters 512 covered by the guide pane. In this latter version of the cluster slider/guide feature, the highlighting pane 510 would indicate to the user what part of the displayed search results correspond to the location of the guide pane 508.

The user can move the guide pane 508 along the independent variable axis of the clusters 512. In one version, a conventional graphic scroll bar is displayed adjacent the graphic data presentation sector for the user to employ in moving the guide pane 508. In another version, the guide pane 508 is moved by the user selecting the pane and then moving it using a mouse or other computer pointing device. Thus, the guide pane 508 itself acts as a slider as well as a guide to the location of the displayed search items within the clusters 512. In yet another version, both guide pane movement options are available. When the user moves the guide pane 508, the search items displayed in the list sector are scrolled in appropriate direction so that the highlighting pane 510 continues to cover those items corresponding to the location of the guide pane 508 on the clusters 512. Thus, it appears to the user that the guide pane 508 and highlighting pane 510 are tied together and move in unison.

2.2.2.1 The Pseudo Histogram Map

The search results items can be displayed in an ascending order pattern of columns or rows on a cluster subdivision-by-subdivision basis, such that each successive column or row associated with a particular subdivision displays as many search results items as will fit in the space allotted for a respective full column or row in the list sector or as many search result items as there are left in the subdivision which are not displayed in a preceding column or row. When this listing configuration is employed, yet another optional feature of the cluster format can be included—namely, a pseudo histogram map feature.

Figure 6:
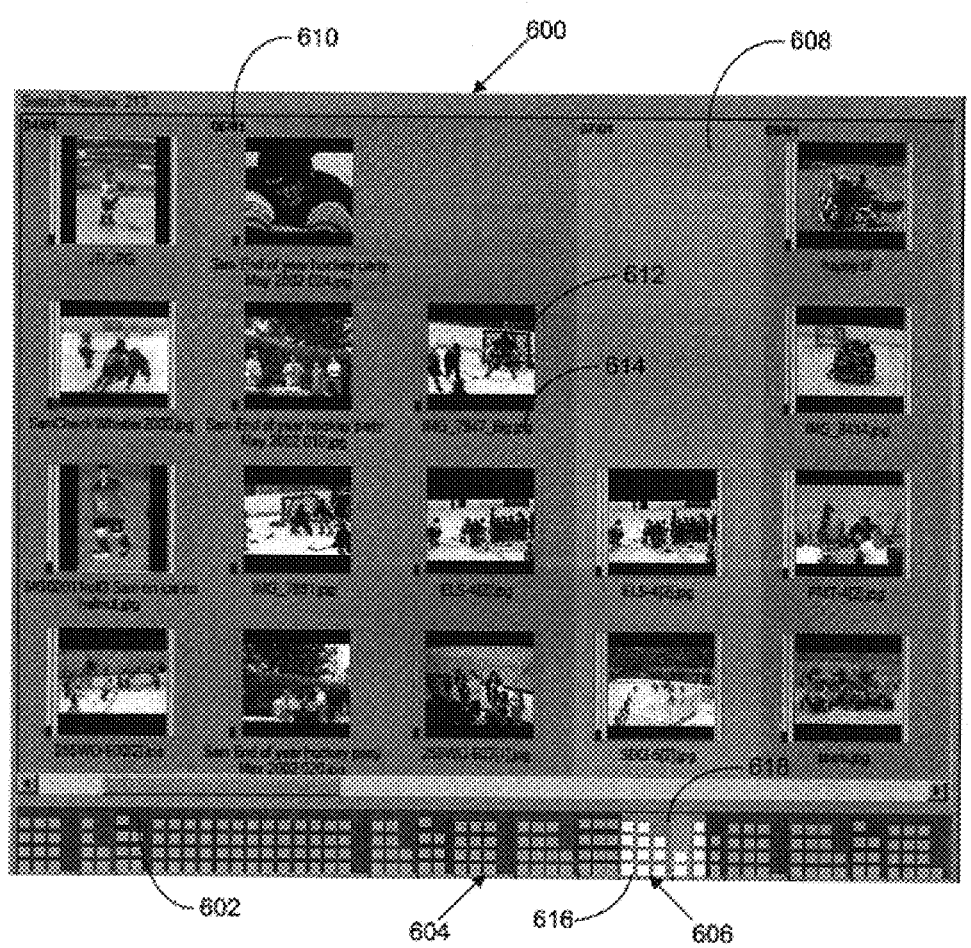
FIG. 6 shows a search results window layout according to the present invention for a cluster format of the search results presentation system and process, with a search results list of image files including representative thumbnails being displayed in the list sector, and the optional cluster slider/guide and pseudo histogram map features implemented.

Referring to the example cluster format window 600 shown in FIG. 6, the previously described histogram that can be superimposed onto the clusters 602 in the graphic data presentation sector 604 is replaced with a pseudo histogram map 606. Before describing the pseudo histogram map 606, it is noted that in the example window 600 shown in FIG. 6, the graphic data presentation sector 604 has a horizontal orientation rather than vertical. The list sector 608 is also oriented horizontally in that the independent axis runs from side-to-side, rather than up and down, and with the scale lines 610 (e.g., dates) running vertically. In addition, the search result items (which are image files in this example) are characterized by a thumbnail 612 of the image associated with the file and its file name 614, rather than using text alone. This characterization can be particularly useful to a user when the search results are image files.

The lines of the pseudo histogram map 606 indicate the quantity of search results items that will be displayed in the list sector 608 within a column, as in the case of the example window of FIG. 6, or in a row if the list sector is oriented vertically. In the example shown in FIG. 6, the lines 616 of the pseudo histogram map 606 are depicted as a series of blocks, rather than a solid line. This is done as a more definitive indicator of the number of search results items associated with that line. This works especially well when there is a one to one correspondence between a block and a single search results item, as there is in the example of FIG. 6. In other words each block represents one search results item. However, it is also possible to make each block represent some prescribed number of search results items if desired.

As indicated above, there is a limit to the number of search results items that can be displayed in a row or column in the list sector 608. For example, in the window depicted in FIG. 6, each column in the list sector can display a maximum of 4 items. This limit in turn dictates the configuration of the pseudo histogram map 606. For example, assume that each cluster subdivision 602 of the search results represents the number of image files created in a month's time. If a subdivision 602 of the search results represents 7 image files as it does for May 2001 in the example, this would be displayed as two lines in the pseudo histogram map 606—one with 4 items and one with 3 items. Thus, in the example window 600 of FIG. 6, when the guide pane 618 is placed over the part of the pseudo histogram map 606 associated with May 2001, the image files corresponding to the two map lines are displayed in the list sector 608. In this way the need to scroll through the displayed search result items is eliminated.

It is noted that each cluster subdivisions 602 (i.e., the visually distinguished regions in graphic data presentation sector representing the previously computed clusters of the search results) is expanded as needed to accommodate the width of the part of the pseudo histogram map 606 representing those search result items within the cluster, but their relative widths stay the same.

The cluster slider/guide operates in the same way as described above in regard to the example window of FIG. 6. Thus, the user moves the guide pane 618 along the independent variable axis of the cluster subdivisions 602 using one of the previously described techniques. In response, the search items displayed in the list sector 608 are scrolled in appropriate direction so that the highlighting pane continues to cover those items corresponding to the location of the guide pane 618 (which is the entire display area of the list sector 608 in FIG. 6) on the clusters 602, and in this case the pseudo histogram map 606 as well.

2.3 Alternate Configurations

While the invention has been described in detail by specific reference to the foregoing embodiments thereof, it is understood that variations and modifications may be made without departing from the true spirit and scope of the invention. For example, while the search results windows has been described as having a particular arrangement of sectors and other elements, these elements can be rearranged within the respective windows as desired. Further, it is noted that while full-featured versions of the interfaces were described, versions having fewer of these features are also possible and within the scope of the present invention.

Wherefore, what is claimed is:

1. In a computer system having a user interface including a display and a user interface selection device, a process for graphically displaying the results of a search to a user on said display via an interactive search results window in which the user views and filters search results items, comprising process actions for:

computing a clustering of the search results items in terms of a user-specified independent variable corresponding to a common attribute of at least some of the search results to form a plurality of cluster subdivisions each comprising a portion of the search results items within a particular range of the independent variable determined by the clustering;

displaying a graphic data presentation sector in the search results window which comprises a series of shapes representing said cluster subdivisions displayed in the order dictated by the independent variable, wherein each subdivision shape is visually distinguished from the other subdivision shapes and has a length in the direction of an axis of the independent variable proportional to the number of search results items within the associated subdivision and a fixed width in the direction perpendicular to the independent variable axis; and upon the user selecting one of the cluster subdivision shapes via said selection device, those search results items associated with the selected subdivision shape are re-clustered and cluster subdivision shapes associated with the re-clustered search result items are displayed in the graphic data presentation sector in lieu of the previously displayed higher-order clustering, thereby effecting a user specified filtering of the search results;

wherein the process action of displaying the graphic data presentation sector further comprises an action of displaying a histogram of the search results items, in terms of the user-specified independent variable, over the cluster subdivision shapes, wherein the bars of the histogram each represents a histogram bin corresponding to a particular range of the independent variable and each have a length proportional to the number of search results items determined to be in the associated bin and extend perpendicular to the independent variable axis, and wherein the independent variable range covered by the histogram bins associated with bars displayed within each cluster subdivision shape falls within the independent variable range of the associated subdivision.

2. The process of claim 1 further comprising displaying a search results counter in the search results window which displays the total number of search results items included in all the cluster subdivisions whose shapes are currently displayed in the graphic data presentation sector.

3. The process of claim 1, further comprising displaying a list sector in the search results window which displays a listing of at least some of the search results items included in the cluster subdivisions whose shapes are currently displayed in the graphic data presentation sector.

4. The process of claim 3, wherein the number of search result items included in the cluster subdivisions whose shapes are currently displayed in the graphic data presentation sector is too large for all of the shapes to be displayed in the space allotted to the list sector in the search results window, and wherein the search results window further comprises a graphic scroll bar displayed adjacent the list sector which the user employs to bring search results items hidden from view due to the space limitation into view.

5. The process of claim 3, wherein the search results items comprise electronic files, and said listing of the search results items comprises a listing of file names associated with each of the files.

6. The process of claim 3, wherein the search results items comprise electronic files, and said listing of the search results items comprises a listing of file names and one or more attributes associated with each of the files.

7. The process of claim 3, wherein the search results items comprise electronic image files, and said listing of the search results items comprises a listing of file names and a thumbnail image representative of the image data of the file.

8. The process of claim 3, wherein the list sector is displayed or not displayed in the search results window based on a user-specified preference.

9. The process of claim 8, further comprising displaying a list sector display button in the search results window which when selected by the user when the list sector is displayed causes the list sector to be hidden from view, and which when selected by the user when the list sector is hidden from view causes the list sector to be displayed.

10. The process of claim 3, further comprising displaying a range list in the list sector of the search results window comprising a listing of the independent variable range and the number of search results items associated with each cluster subdivision whose shapes are currently displayed in the graphic data presentation sector.

11. The process of claim 10, wherein the process action of displaying the range list comprises an action of visually distinguishing each listing in the same way as the cluster subdivision shape associated therewith is distinguished in the graphic data presentation sector.

12. The process of claim 10, wherein at any one time either the range list or the listing of search results items is displayed in the list sector, but not both, and wherein the user specifies which is to be displayed.

13. The process of claim 1, wherein the user-specified independent variable corresponding to a common attribute of at least some of the search results comprises one of (i) a date associated with a search results item, (ii) a search result item type, and (iii) a file size of a search results item.

14. The process of claim 1, wherein the process action of displaying the graphic data presentation sector further comprises an action of displaying a scale for the independent variable comprising periodically placed alphanumeric characters and markings indicating the value of the independent variable at the location where it is display along the independent variable axis.

15. The process of claim 1, wherein the proportional length of said subdivision shapes is based on one of (i) linear proportionality, or (ii) logarithmic proportionality.

16. The process of claim 1, further comprising displaying a range list sector in the search results window which displays a listing of the independent variable range and the number of search results items associated with each cluster subdivision whose shape is currently displayed in the graphic data presentation sector.

17. The process of claim 16, wherein the process action of displaying the range list sector comprises an action of visually distinguishing each listing in the same way as the cluster subdivision shape associated therewith is distinguished in the graphic data presentation sector.

18. The process of claim 1, wherein whenever the user selects one of the cluster subdivision shapes via said selection device, the process action of displaying a histogram of the search results items comprises an action of displaying a new histogram computed for just those search results items associated with the selected cluster subdivision shape which is displayed in the graphic data presentation sector in lieu of the previously displayed higher-order histogram.

19. The process of claim 1, wherein the user can specify whether the histogram is displayed or hidden from view.

20. The process of claim 1, further comprises a process action of the user continuing to select a cluster subdivision shape of the currently-displayed clustering each time a previous selection has resulted in a new clustering being computed for just those search results items associated with the selected subdivision shape and displayed in the graphic data presentation sector.

21. The process of claim 1, further comprising displaying an overview sector in the search results window comprising continuously displaying an overall clustering computed from the complete set of search results in terms of said user-selected independent variable corresponding to a common attribute of at least some of the search results.

22. The process of claim 21, further comprising displaying an indicator pane covering the portion of said overall clustering displayed in the overview sector corresponding to the search results items used to compute the clustering currently displayed in the graphic data presentation sector, said indicator pane being visually distinguished from the remaining parts of the overall clustering.

23. The process of claim 3, further comprising the process actions of:
displaying a guide pane over a fractional region of the displayed cluster subdivision shapes in the direction of the axis of the independent variable, said guide pane being visually distinguished from the cluster subdivision shapes but allowing the cluster subdivision shapes to be seen through the guide pane and representing a currently highlighted portion of the search result items corresponding to the cluster subdivision shapes covered thereby;
displaying a highlighting pane over at least a portion of the search results items listed in said list sector, wherein the highlighting pane is visually distinguished from the listed search results items in a manner that allows the items to be seen through the highlighting pane, and wherein the search result items covered by the highlighting pane correspond to the search result items associated with the cluster subdivision shape or subdivision shapes or parts thereof covered by the guide pane.

24. The process of claim 23, wherein the process action of displaying a highlighting pane comprises an action of displaying the highlighting pane in a manner similar to the way the guide pane is visually distinguished from the cluster subdivision shapes so as to indicate to the user that the guide pane and highlighting pane are related.

25. The process of claim 23, wherein the size of the fractional region associated with the guide pane along the independent variable axis is large enough to encompass all the search result items that are able to be displayed in the list sector in view of the space allotted the list sector.

26. The process of claim 23, wherein the size of the fractional region associated with the guide pane along the independent variable axis is not large enough to encompass all the search result items that are displayed in the list sector, thereby resulting in the highlighting pane covering only a portion of the search results items being displayed in the list sector.

27. The process of claim 23, further comprising a process actions of, in response to a user moving the guide pane along the independent variable axis of the cluster subdivision shapes to highlight a desired portion thereof, moving the highlighting pane to cover those search result items listed in the list sector corresponding to the search result items associated with the cluster subdivision shape or subdivision shapes or parts thereof covered by the guide pane.

28. The process of claim 27, wherein the process action of moving the highlighting pane in response to a user moving the guide pane, comprises an action of, whenever the number of search results items associated with the cluster subdivision shapes exceeds that which can be displayed at one time in the list sector and the user moves the guide pane to cover a portion of the cluster subdivision shapes that is associated with search results items not currently displayed in the list sector, scrolling the search result items so as to bring the items associated with the portion of the cluster subdivisions covered by the guide pane into view in the list sector.

29. The process of claim 3, wherein the process action of displaying the list sector comprises an action of displaying search results items in ascending order in regard to the independent variable, and in one of columns or rows, on a cluster subdivision-by-subdivision basis, such that each successive column or row associated with a particular subdivision displays as many search results items as will fit in the space allotted for a respective full column or row in the list sector or as many search result items as there are left in the subdivision which are not displayed in a preceding column or row.

30. The process of claim 29, wherein the process action of displaying the graphic data presentation sector further comprises the actions of:
    displaying a pseudo histogram map of the search results items over the cluster subdivision shapes, wherein the pseudo histogram map has bars oriented perpendicular to the independent variable axis each of which represents a column or row of search results items as they would be displayed in the list sector and each of which has a length proportional to the number of search results items represented; and
    displaying each cluster subdivision shape with a length, while still proportional to the number of search results associated therewith, that is long enough so that all the pseudo histogram map bars representing the search results items of the subdivision are displayed within the subdivision shape.

31. The process of claim 30, wherein the process action of displaying the pseudo histogram map comprises an action of displaying the bars thereof as a series of separated co-linear blocks each of which represents the same number of search results items.

32. The process of claim 31, wherein each pseudo histogram map bar block represents one search results item.

33. A computer-readable storage medium having computer-executable instructions stored thereon for graphically displaying the results of a search to a user on a display device via a search results window, said computer-executable instructions operable to:
    compute a clustering of the search results items in terms of a user-specified independent variable corresponding to a common attribute of at least some of the search results to form a plurality of cluster subdivisions each comprising a portion of the search results items within a particular range of the independent variable determined by the clustering; and
    display a graphic data presentation sector in the search results window which comprises,
    a series of shapes representing said cluster subdivisions displayed in the order dictated by the independent variable, wherein each subdivision shape is visually distinguished from the other subdivision shapes and has a length in the direction of an axis of the independent variable proportional to the number of search results items within the associated subdivision and a fixed width in the direction perpendicular to the independent variable axis, and
    upon the user selecting one of the cluster subdivision shapes via said selection device, those search results items associated with the selected subdivision shape are re-clustered and cluster subdivision shapes associated with the re-clustered search result items are displayed in the graphic data presentation sector in lieu of the previously displayed higher-order clustering, thereby effecting a user specified filtering of the search results;
    a histogram of the search results items, in terms of the user-specified independent variable, displayed over the cluster subdivision shapes, wherein the bars of the histogram each represents a histogram bin corresponding to a particular range of the independent variable and each have a length proportional to the number of search results items determined to be in the associated bin and extend perpendicular to the independent variable axis, and wherein the independent variable range covered by the histogram bins associated with bars displayed within each cluster subdivision shape falls within the independent variable range of the associated subdivision.

* * * * *

UNITED STATES PATENT AND TRADEMARK OFFICE
CERTIFICATE OF CORRECTION

PATENT NO. : 7,334,195 B2  
APPLICATION NO. : 10/684620  
DATED : February 19, 2008  
INVENTOR(S) : David James Gemmell et al.

Page 1 of 1

It is certified that error appears in the above-identified patent and that said Letters Patent is hereby corrected as shown below:

In column 4, line 39, after "patent" insert -- or application --.

In column 4, line 40, after "patent" insert -- or patent application publication --.

In column 16, line 48, in Claim 2, delete "1" and insert -- 1, --, therefor.

Signed and Sealed this
Fifteenth Day of February, 2011

David J. Kappos
*Director of the United States Patent and Trademark Office*